US012586854B2

(12) United States Patent
Jeon et al.

(10) Patent No.: US 12,586,854 B2
(45) Date of Patent: ***Mar. 24, 2026

(54) BATTERY SUB-PACKING UNIT

(71) Applicant: SK On Co., Ltd., Seoul (KR)

(72) Inventors: Hae Ryong Jeon, Daejeon (KR); Yang Kyu Choi, Daejeon (KR); Tae Il Kim, Daejeon (KR); Kang Gu Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 228 days.

This patent is subject to a terminal disclaimer.

(21) Appl. No.: 18/642,839

(22) Filed: Apr. 23, 2024

(65) Prior Publication Data

US 2024/0274946 A1 Aug. 15, 2024

Related U.S. Application Data

(63) Continuation of application No. 17/538,533, filed on Nov. 30, 2021, now Pat. No. 11,996,574.

(30) Foreign Application Priority Data

Nov. 30, 2020 (KR) ........................ 10-2020-0164098

(51) Int. Cl.
*H01M 50/24* (2021.01)
*H01M 10/0525* (2010.01)
(Continued)

(52) U.S. Cl.
CPC ....... *H01M 50/24* (2021.01); *H01M 10/0525* (2013.01); *H01M 50/209* (2021.01);
(Continued)

(58) Field of Classification Search
CPC .. H01M 50/24; H01M 50/209; H01M 50/211; H01M 50/202; H01M 10/653;
(Continued)

(56) References Cited

U.S. PATENT DOCUMENTS 10,411,233 B2 9/2019 Yoon et al.
2011/0151319 A1* 6/2011 Cherng ............... H01M 50/186
429/177
(Continued)

FOREIGN PATENT DOCUMENTS

CN 103427053 A * 12/2013 .......... H01M 10/613
EP 2426751 A1 3/2012
(Continued)

OTHER PUBLICATIONS

Office Action for Korean Patent Application No. 10-2020-0164098 issued by the Korean Intellectual Property Office (KIPO) on May 30, 2025.
(Continued)

*Primary Examiner* — Imran Akram
(74) *Attorney, Agent, or Firm* — IP & T GROUP LLP

(57) ABSTRACT

A battery sub-packing unit includes at least one battery cell; and a case accommodating the at least one battery cell, wherein the case comprises an end panel on which an electrode tab of the at least one battery cell is fastened to extend into an external space, and having a lower end portion in which a sub-vent hole is formed for communication between the external space and an internal space in which the at least one battery cell is disposed.

16 Claims, 8 Drawing Sheets

(51) Int. Cl.

| | |
|---|---|
| *H01M 50/202* | (2021.01) |
| *H01M 50/209* | (2021.01) |
| *H01M 50/273* | (2021.01) |
| *H01M 50/30* | (2021.01) |

(52) U.S. Cl.
CPC ......... *H01M 50/273* (2021.01); *H01M 50/30* (2021.01); *H01M 50/202* (2021.01)

(58) Field of Classification Search
CPC ........... H01M 10/6555; H01M 10/658; H01M 50/242
See application file for complete search history.

(56) References Cited

U.S. PATENT DOCUMENTS

| | | | |
|---|---|---|---|
| 2012/0052371 A1 | 3/2012 | Kim et al. | |
| 2014/0227576 A1* | 8/2014 | Meintschel ....... | H01M 10/0418 429/178 |
| 2015/0214569 A1 | 7/2015 | Kim et al. | |
| 2016/0036024 A1 | 2/2016 | Choi et al. | |
| 2016/0322673 A1* | 11/2016 | Meintschel ......... | H01M 50/209 |
| 2016/0365554 A1* | 12/2016 | Iqbal ..................... | H01M 50/40 |
| 2017/0054124 A1* | 2/2017 | Yoon ................... | H01M 50/264 |
| 2018/0254444 A1 | 9/2018 | Yoon et al. | |

| | | | |
|---|---|---|---|
| 2020/0099114 A1 | 3/2020 | Ryu et al. | |
| 2020/0176745 A1 | 6/2020 | Lee | |
| 2020/0343604 A1 | 10/2020 | Lee et al. | |
| 2021/0050571 A1 | 2/2021 | Chun | |
| 2021/0328251 A1 | 10/2021 | Zhao et al. | |

FOREIGN PATENT DOCUMENTS

| | | | | |
|---|---|---|---|---|
| EP | 3641006 A1 | 4/2020 | | |
| EP | 3671890 A1 | 6/2020 | | |
| KR | 10-0649659 B1 | 11/2006 | | |
| KR | 10-2008-0064916 A | 7/2008 | | |
| KR | 101384919 B1 * | 4/2014 | ........... | H01M 50/10 |
| KR | 10-2016-0014828 A | 2/2016 | | |
| KR | 10-2018-0092406 A | 8/2018 | | |
| KR | 10-2019-0093300 A | 8/2019 | | |
| KR | 10-2019-0094921 A | 8/2019 | | |
| KR | 10-2020-0050296 A | 5/2020 | | |
| KR | 10-2020-0078344 A | 7/2020 | | |
| KR | 10-2020-0125184 A | 11/2020 | | |

OTHER PUBLICATIONS

Extended European Search Report for the European Patent Application No. 21211099.3 issued by the European Patent Office on Apr. 13, 2022.

* cited by examiner

BATTERY SUB-PACKING UNIT

CROSS-REFERENCE TO RELATED APPLICATION(S)

This application is a continuation of U.S. patent application Ser. No. 17/538,533 filed on Nov. 30, 2021, which claims benefit of priority to Korean Patent Application No. 10-2020-0164098 filed on Nov. 30, 2020 in the Korean Intellectual Property Office, the disclosure of which is incorporated herein by reference in its entirety.

BACKGROUND

1. Field

The present disclosure relates to a battery sub-packing unit.

2. Description of Related Art

As technological developments and demand for mobile devices, electric vehicles, and energy storage systems (ESS) increase, the demand for secondary battery cells as an energy source is rapidly increasing. A secondary battery cell is a battery capable of repeating charging and discharging of electrical energy, because mutual conversion between chemical energy and electrical energy are reversible.

Such a secondary battery cell may include an electrode assembly such as a positive electrode, a negative electrode, a separator, and an electrolyte, main components of the secondary battery, and a cell body member of a laminated film case that protects the electrode assembly.

However, such an electrode assembly generates heat while undergoing charging and discharging of electrical energy, and an increase in temperature due to such generation of heat may deteriorate performance of the secondary battery cell.

In addition, when such generation of heat becomes severe, an internal pressure of the secondary battery cell may rise, resulting in a problem in which the secondary battery cell ignites.

Moreover, when a plurality of secondary battery cells are mounted, such as in an electric vehicle, an energy storage system (ESS), or the like, the secondary battery cell may explode with such ignition, and flames thereof may be propagated to an adjacent secondary battery cell.

That is, there may be a problem in that gas, flames, or the like, generated in the secondary battery cell, may not be discharged to an external space, but may explode in a chain reaction while propagating to an adjacent secondary battery cell.

Therefore, in order to overcome or improve the above-mentioned problems or limitations, it is necessary to study secondary battery sub-packing units.

SUMMARY

An aspect of the present disclosure is to provide a battery sub-packing unit preventing propagation of ignition of battery cells.

Another aspect of the present disclosure is to provide a battery sub-packing unit inducing flames to an external space or extinguishing the flames, when a battery cell is ignited.

According to an aspect of the present disclosure, a battery sub-packing unit includes at least one battery cell; and a case accommodating the at least one battery cell, wherein the case includes an end panel on which an electrode tab of the at least one battery cell is fastened to extend into an external space, and having a lower end portion in which a sub-vent hole is formed for communication between the external space and an internal space in which the at least one battery cell is disposed.

In this case, in a battery sub-packing unit according to an embodiment, the end panel may includes a front end panel and a rear end panel, and the case may include a surrounding cover having front and rear end portions, wherein the front and rear end panels are respectively coupled to the front and rear end portions of the surrounding cover of the case, and wherein the surrounding cover surrounds the at least one battery cell in a circumferential direction of the end panel.

In addition, in a battery sub-packing unit according to an embodiment, the end panel may include a sub-guide tube disposed around the sub-vent hole, communicating with the sub-vent hole, and extending in an outward direction.

Further, in a battery sub-packing unit according to an embodiment, an edge portion of the front and rear end panels may be formed of a metal material, identical to a metal material of the surrounding cover, and may be coupled by welding to the front end portion and the rear end portion of the surrounding cover, respectively, wherein each of the front and rear end panels include a slit opening through which the electrode tab of the at least one battery cell passes, and wherein a portion of each of the front and rear end panels which includes the slit opening is formed of an insulating material.

In this case, in a battery sub-packing unit according to an embodiment, the surrounding cover may include at least one of aluminum, stainless steel, or a metal having a melting point of 1000° C. or higher.

In addition, in a battery sub-packing unit according to an embodiment, the surrounding cover may include an accommodating can having the front and rear end portions to which the front and rear end panels are respectively coupled, the accommodating can surrounding a lower surface portion and a side surface portion of the at least one battery cell; and an upper panel coupled to an upper end portion of the accommodating can and surrounding an upper surface portion of the at least one battery cell.

Further, in a battery sub-packing unit according to an embodiment, a coupling tongue protruding into the external space may be formed on the upper end portion of the accommodating can, and an extended flange portion including a coupling groove coupled to the coupling tongue may be provided on the both end portion of the upper panel.

In a battery sub-packing unit according to an embodiment, the surrounding cover may include an accommodating can having the front and rear end portions to which the front and rear end panels are respectively coupled, and surrounding a lower surface portion and a side surface portion of the at least one battery cell; and a pair of upper fastening portions extending from side wall portions of the accommodating can opposing each other, arranged to have a shape bent in a direction of an upper surface portion of the at least one battery cell, and fastened to each other to surround the upper surface portion of the at least one battery cell.

In particular, in a battery sub-packing unit according to an embodiment, each of the pair of upper fastening portions may include a first fastening portion extending from one side wall portion of the accommodating can, having a hook protruding toward the one side wall of the accommodating can; and a second fastening portion extending from the other side wall portion of the accommodating can and having an accommodation groove into which the hook is fitted.

In addition, a battery sub-packing unit according to an embodiment may further include an inner pad disposed in the internal space of the case, contacting the at least one battery cell accommodated in the case, and generating at least one of carbon dioxide or nitrogen during oxidation to block inflow of external oxygen.

In this case, in a battery sub-packing unit according to an embodiment, the inner pad may be formed of a melamine material.

In addition, in a battery sub-packing unit according to an embodiment, the inner pad may be disposed in at least one of between a side surface of the at least one battery cell and an inner surface of the case and between an upper surface of the at least one battery cell and the inner surface of the case.

Further, in a battery sub-packing unit according to an embodiment, when the at least one battery cell is provided as a plurality of battery cells, the inner pad may be disposed between battery cells adjacent to each other.

In addition, in a battery sub-packing unit according to an embodiment, the inner pad may have both end portions in which a pad flange portion extending in an electrode tab direction of the at least one battery cell is provided.

According to an aspect of the present disclosure, a battery sub-packing unit comprising: at least two battery cells; an internal pad separating the at least two battery cells; and a case enclosing the at least two battery cells and the internal pad; wherein the case comprises an accommodating can, front and rear end panels coupled to front and rear end portions of the accommodating can, and a pair of upper fastening portions extending in opposite directions from opposite side walls of the accommodating can, and wherein the pair of upper fastening portions are coupled to each other to secure the case around the at least two battery cells.

In a battery sub-packing unit according to an embodiment, each of the front and rear end panels includes at least two slit openings through which electrode tabs from the at least two battery cells are passing to extend out of the case, and at least one sub-vent for allowing fluid communication between an interior of the case and an outside of the case.

In a battery sub-packing unit according to an embodiment, the coupling of the first and second fastening portions may include latching a plurality of hooks of the first fastening portion with a corresponding plurality of accommodation grooves of the second fastening portion.

In a battery sub-packing unit according to an embodiment, the inner pad is in direct contact with the at least two battery cells and is configured to generate at least one of carbon dioxide or nitrogen during oxidation to block inflow of external oxygen inside the case.

In a battery sub-packing unit according to an embodiment, The inner pad may be formed of a melamine material.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
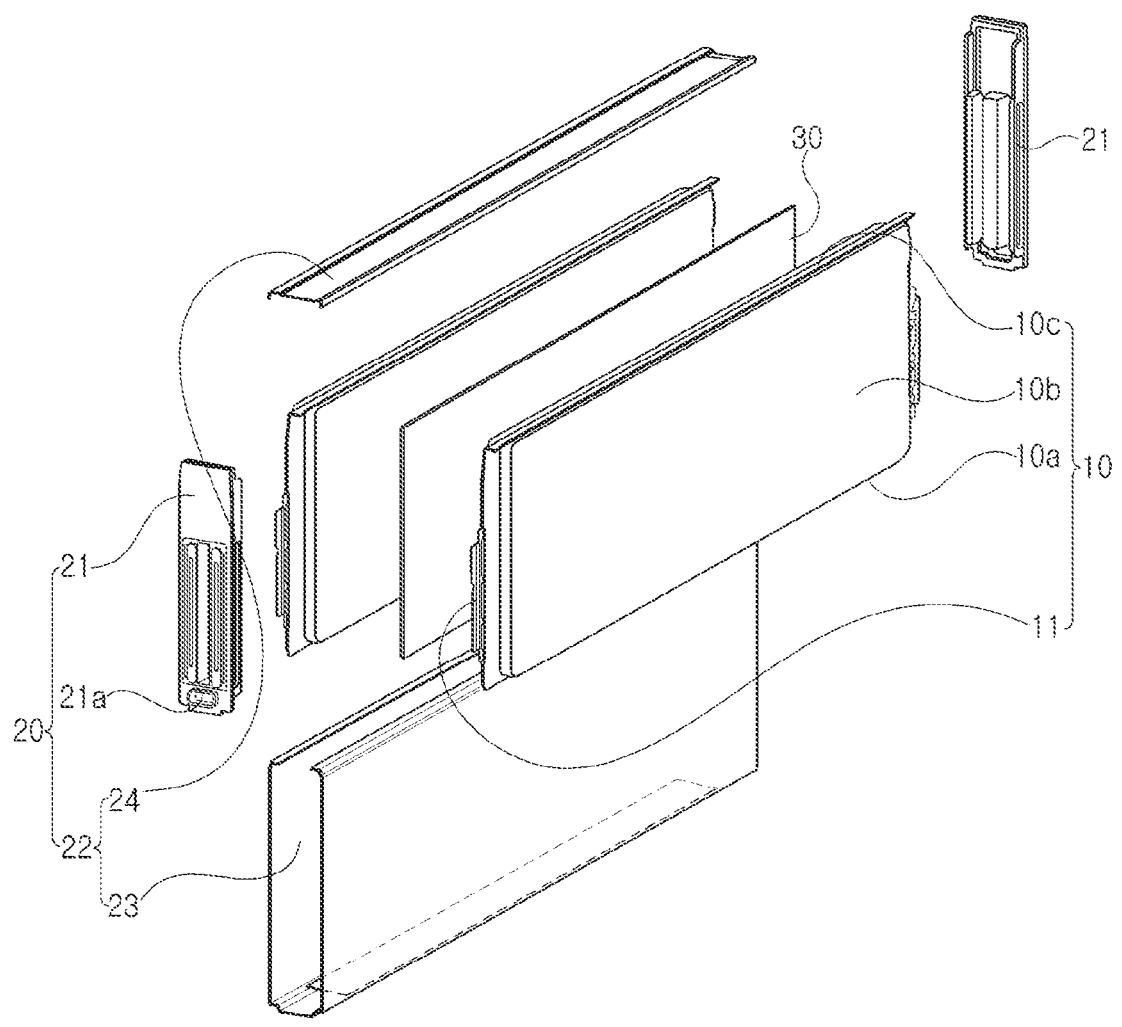
FIG. 1 is an exploded perspective view illustrating a battery sub-packing unit according to an embodiment.

Hereinafter, preferred embodiments of the present disclosure will be described with reference to the accompanying drawings. However, embodiments of the present disclosure may be modified in various other forms, and the scope of the present disclosure is not limited to embodiments described below. In addition, embodiments of the present disclosure may be provided in order to more completely explain the present disclosure to those of ordinary skill in the art. The shapes and sizes of elements in the drawings may be exaggerated for clarity of description.

Also, in this specification, singular expressions include plural expressions unless the context clearly dictates otherwise, and the same reference numerals or reference numerals assigned in a similar manner throughout the specification refer to the same element or corresponding element.

Figure 2:
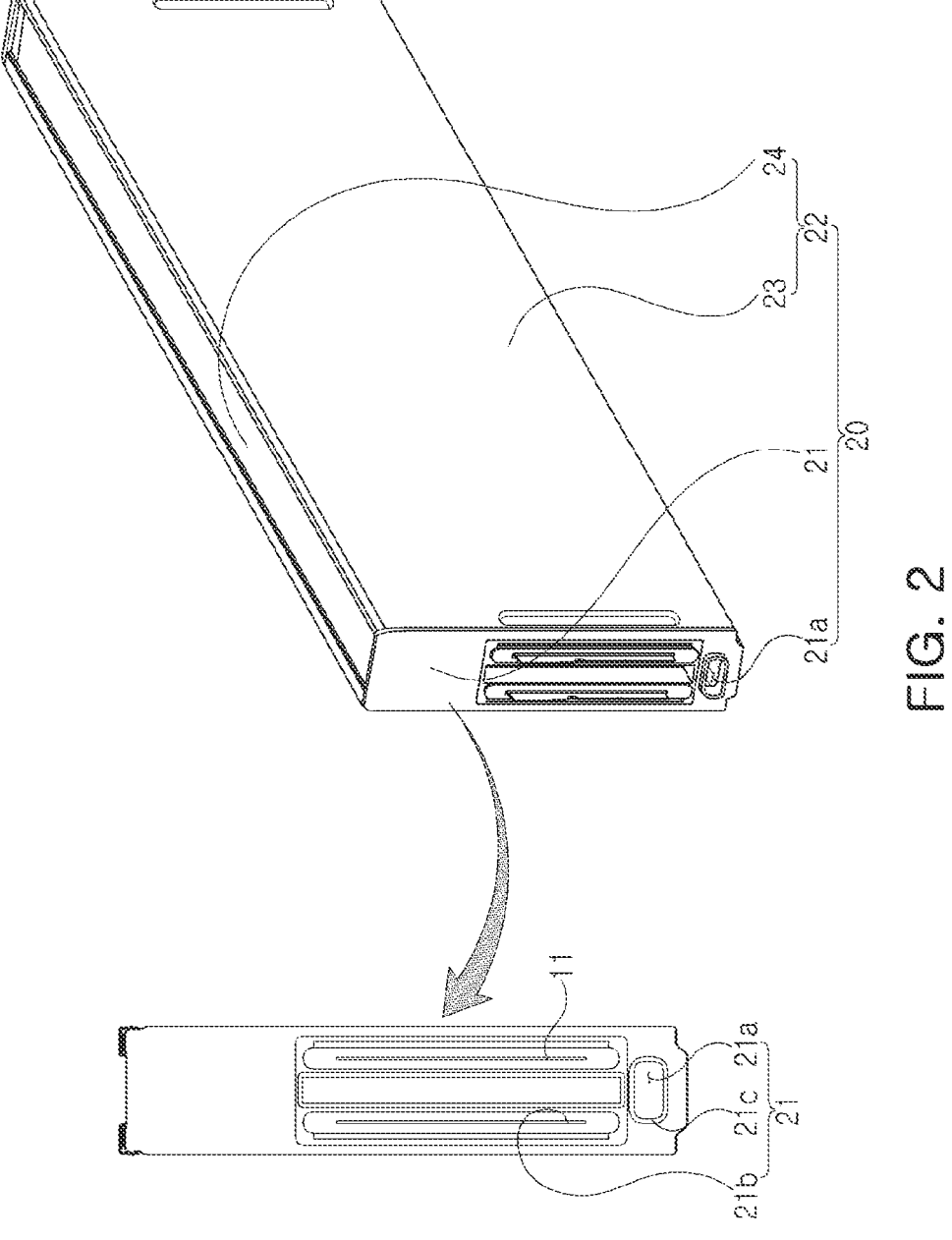
FIG. 2 is an enlarged view of a portion in which a sub-vent hole is formed in a battery sub-packing unit according to an embodiment.

FIG. 1 is an exploded perspective view illustrating a battery sub-packing unit according to an embodiment, and FIG. 2 is an enlarged view of a portion in which a sub-vent hole 21a is formed in a battery sub-packing unit according to an embodiment.

Referring to the drawings, a battery sub-packing unit according to an embodiment may include a battery cell 10 and a case 20.

The battery sub-packing unit may be divided into a first embodiment and a second embodiment, according to a shape of a surrounding cover 22. Thereamong, FIGS. 1 and 2 are illustrated based on the first embodiment in which the surrounding cover 22 includes an upper panel 24. However, FIGS. 1 and 2 are only illustrated based on the first embodiment in order to understand the battery sub-packing unit including the battery cell 10 and the case 20. For example, the battery sub-packing unit including the battery cell 10 and the case 20 is not limited to the first embodiment, and the surrounding cover 22 may also be applied to the second embodiment including an upper fastening portion 25.

In this case, the battery cell 10 may be provided as at least one battery cell 10. The case 20 may accommodate the battery cell 10. In addition, the case 20 may have a lower end portion in which a sub-vent hole 21a is formed to communicate between an external space and an internal space in which the battery cell 10 is disposed.

Therefore, the battery sub-packing unit may induce flames from the lower end portion of the battery sub-packing unit to an external space, when the battery cell 10 is ignited. Therefore, it is possible to prevent a problem that ignition of battery cells 10 accommodated in a battery sub-packing unit may be propagated to the battery cells 10 accommodated in an adjacent battery cell.

For example, since the battery sub-packing unit induces a path to discharge a high-temperature and high-pressure flames and gas, generated in the battery cell 10, to an external space through the sub-vent hole 21*a*, it is possible not to affect a battery cell 10 accommodated in an adjacent battery sub-packing unit.

In addition, since the battery sub-packing unit induces flames from the lower end portion to an external space, when the battery sub-packing unit is mounted on an electric vehicle, it may be minimized a problem that an occupant of the electric vehicle is affected by flames when a battery cell 10 is ignited. For example, since a plurality of battery sub-packing units may be installed in a battery module, and the battery module may be generally mounted on a bottom portion of the electric vehicle, the occupant of the electric vehicle may be disposed above the battery sub-packing unit. Therefore, when flames are discharged from the lower end portion of the battery sub-packing unit, an effect on the occupant of the electric vehicle may be minimized.

In this case, the battery cell 10 may include an electrode assembly and a cell body member surrounding the electrode assembly.

The electrode assembly may substantially include an electrolyte and may be together accommodated and used in the cell body member. The electrolyte may include a lithium salt such as LiPF$_6$, LiBF$_4$, or the like in an organic solvent such as ethylene carbonate (EC), propylene carbonate (PC), diethyl carbonate (DEC), ethyl methyl carbonate (EMC), dimethyl carbonate (DMC), or the like. Furthermore, the electrolyte may be in a liquid phase, a solid phase, or a gel phase.

The cell body member may be configured to protect the electrode assembly and accommodate the electrolyte, and, for example, the cell body member may be provided as a pouch-type member or a can-type member. In this case, the pouch-type member is configured to accommodate the electrode assembly therein, and may be sealed on three or four sides along the periphery of the electrode assembly. For example, the pouch-type member may be sealed along three surfaces of the upper surface portion 10*c* and the front and rear portions excluding the lower surface portion 10*a* of the electrode assembly to accommodate the electrode assembly in an inner space of the pouch-type member. In addition, the can-type member is configured to accommodate the electrode assembly therein, and may be sealed on one side. For example, the can-type member may be sealed along the upper surface portion 10*c* of the electrode assembly to accommodate the electrode assembly therein.

Pouch-type battery cells 10 and can-type battery cells 10 may be only examples of a battery cell 10 accommodated in a battery sub-packing unit according to an embodiment, and the battery cell 10 accommodated in the battery sub-packing unit is not limited thereto.

In addition, the battery cell 10 may include a lower surface portion 10*a*, an upper surface portion 10*c*, and a side surface portion 10*b*, and also may include front and rear portions through which an electrode tab 11 connected to the electrode assembly is exposed to an external space.

The case 20 may be configured to surround at least one surface of the battery cell 10. For example, a pair of battery cells 10 may be accommodated in the case 20.

Therefore, when flames are generated due to explosion of the battery cell 10, the flames may be induced to a sub-vent hole 21*a*. For example, a peripheral portion of the battery cell 10 may be isolated by the case 20, and a high-temperature and high-pressure flames and gas generated by igniting the battery cell 10 may be induced and discharged through the sub-vent hole 21*a* to an external space. Therefore, it is possible to relieve the flames or the like generated in any one battery sub-packing unit so as not to lead to an explosion, and also not to affect a battery cell 10 accommodated in an adjacent battery sub-packing unit.

In particular, the sub-vent hole 21*a* may be disposed in the lower end portion of the case 20. Therefore, a problem of propagating a high-temperature and high-pressure flames and gas generated in the battery cell 10 in the battery sub-packing unit, above the battery sub-packing unit, may be prevented.

For example, when the battery sub-packing unit is mounted in an electric vehicle, it is possible to improve a problem that an occupant of the electric vehicle located above the battery sub-packing unit is injured by a high temperature and high pressure flames and gas.

In addition, the case 20 of the battery sub-packing unit according to an embodiment may include an end panel 21 and a surrounding cover 22, to surround and accommodate the battery cell 10.

Specifically, in the end panel 21, the electrode tab 11 of the battery cell 11 may be fastened to extend into an external space, and a lower end portion in which the sub-vent hole 21*a* is formed may be provided. The surrounding cover 22 may have both end portions to which the end panel 21 is respectively coupled, and may surround the battery cell 10 in a circumferential direction of the end panel 21.

In this case, the end panel 21 may cooperate with the surrounding cover 22 to accommodate the battery cell 10 in an isolated form from an external space, except for a portion in which the sub-vent hole 21*a* is formed. Therefore, flames, gas, or the like generated in the battery cell 10 may be induced to the sub-vent hole 21*a*.

The end panel 21 may be disposed in a region in which the electrode tab 11 of the battery cell 10 is provided, to be coupled to the surrounding cover 22. For example, the end panel 21 may be disposed on the front and rear portions of the battery cell 10, respectively. For example, when the end panel 21 surrounds the battery cell 10 in a state in which electrode tab 11 is provided in the front and rear portions, the end panel 21 may be disposed in the front and rear portions of the battery cell 10, respectively. However, the present disclosure is not limited thereto. When the electrode tab 11 is provided only in one end portion of the front or rear portion, and the electrode tab 11 surrounds the battery cell provided in at least one of the upper end portion, the lower end portion, or the side surface portion, the end panel 21 may be disposed in a region in which the electrode tab 11 is provided.

In addition, the end panel 21 may further include a sub-guide tube 21*c* in order to enhance an effect of inducing flames, gas, or the like discharged through the sub-vent hole 21*a* in a desired direction. For example, an end panel 21 of a battery sub-packing unit according to an embodiment may include a sub-guide tube 21*c*. The sub-guide tube 21*c* may be disposed around the sub-vent hole 21*a*, may communicate with the sub-vent hole 21*a*, and may be provided to extend in an outward direction.

In addition, the end panel 21 may be formed to include a plurality of materials. For example, an end panel 21 of a battery sub-packing unit according to an embodiment may have an edge portion formed of a metal material, identical to a metal material of the surrounding cover 22 and welded and coupled to the surrounding cover 22, and a central portion of the end panel 21 in which a slit opening 21*b* through which the electrode tab 11 passes is formed may be formed of an insulating material.

For example, the edge portion of the end panel 21 may be formed of an aluminum material, a stainless steel material, or the like, in which the surrounding cover 22 is formed, and the central portion of the end panel 21 in which the slit opening 21*b* is formed may be formed of a plastic material.

In this case, the edge portion of the end panel 21 formed of the metal material and the central portion of the end panel 21 formed of the plastic material may be integrally formed by double injection, or may be provided as an integrated portion combined with each other to have an assembly structure.

As such, since the edge portion of the end panel 21 is formed of a metal material, identical to a metal material of the surrounding cover 22, bonding by welding may be facilitated. In addition, since the central portion of the end panel 21 is formed of an insulating material, electrical influence on the electrode tab 11 may be minimized.

The surrounding cover 22 may be configured to cooperate with the end panel 21 to isolate the battery cell 10. For this purpose, the surrounding cover 22 may be provided to surround the lower surface portion 10*a*, the side surface portion 10*b*, and the upper surface portion 10*c* of the battery cell 10, excluding the front and rear portions of the battery cell 10.

A structure of the surrounding cover 22 may be divided into a first embodiment and a second embodiment.

For example, the surrounding cover 22 may be configured to have the first embodiment including an accommodating can 23 and an upper panel 24, and the second embodiment including an accommodating can 23 and an upper fastening portion 25. A detailed description of the first embodiment of the surrounding cover 22 will be described later with reference to FIG. 3. A detailed description of the second embodiment of the surrounding cover 22 will be described later with reference to FIGS. 4 to 6.

In addition, a thickness and a material of the surrounding cover 22 may be limited to prevent melting by flames and secure fire resistance. For example, the case 20 may be formed of a metal material having a thickness of about 0.2 mm to about 0.5 mm.

Specifically, a surrounding cover 22 of a battery sub-packing unit according to an embodiment may be formed of an aluminum material or a stainless steel material, or a metal material having a melting point of 1000° C. or higher.

In this case, when the surrounding cover 22 is formed of an aluminum material, it may be provided as the first embodiment of the surrounding cover 22. This may be because the aluminum material has excellent formability, and allows performing an extrusion molding process and a die casting process.

In addition, when the surrounding cover 22 is formed of a stainless steel material, it may be provided as the second embodiment of the surrounding cover 22. This may be because the stainless steel material has lower formability than the aluminum material, and may be difficult to maintain a shape thereof due to spring back after performing a press forming process and a bending forming process. For example, the second embodiment of the surrounding cover 22 may make firm coupling while improving a problem caused by the spring back occurring after forming the surrounding cover 22.

In addition, if the material of the surrounding cover 22 is formed of a metal material having a melting point of 1000° C. or higher, even when flames occurs in the battery cell 10, a shape thereof may be maintained without melting thereof. Therefore, flames, gas, or the like generated in the case 20 may be induced to the sub-vent hole 21*a*.

Figure 3:
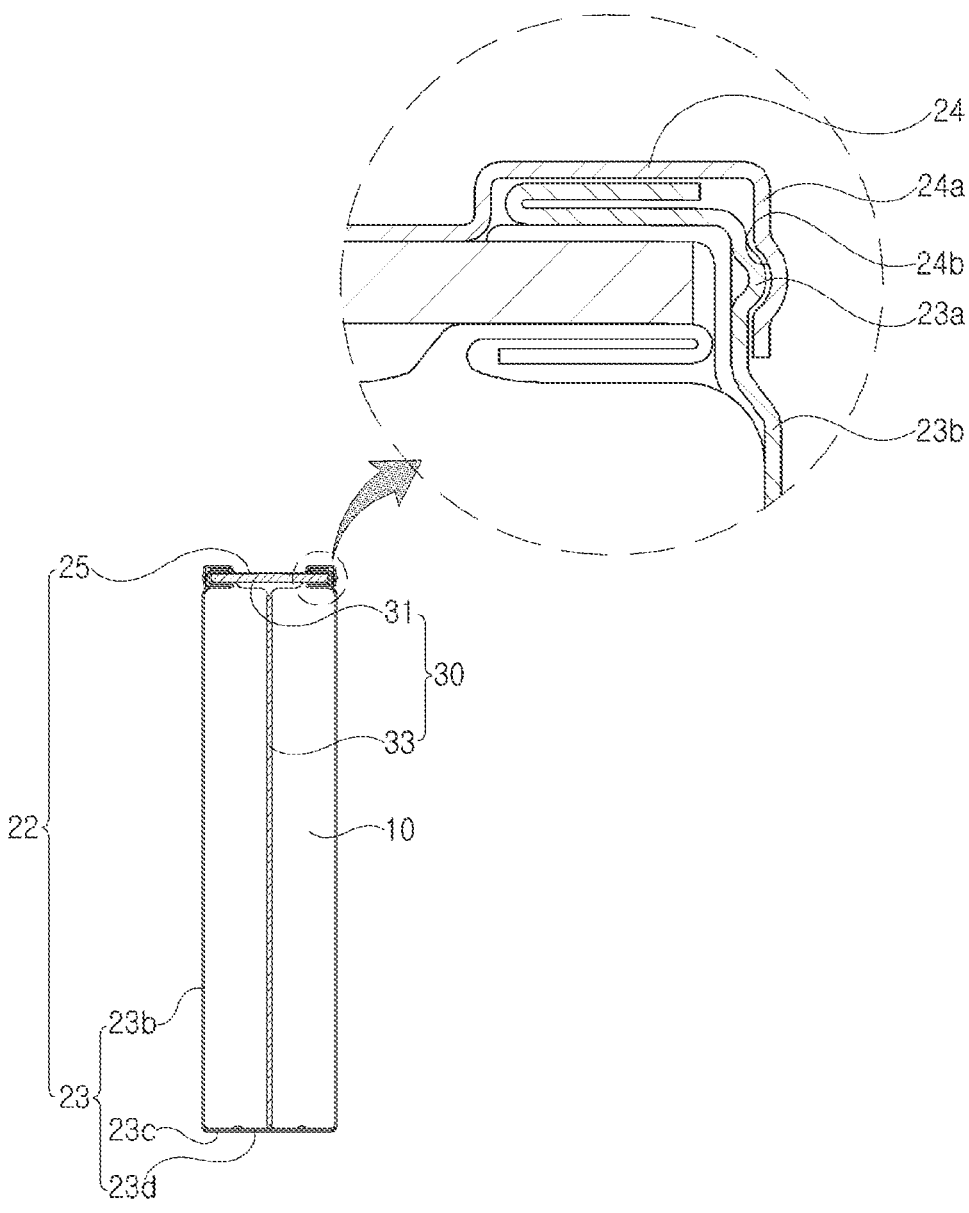
FIG. 3 is a cross-sectional view illustrating an embodiment in which a surrounding cover includes an accommodating can and an upper panel in a battery sub-packing unit.

FIG. 3 is a cross-sectional view illustrating an embodiment in which a surrounding cover 22 includes an accommodating can 23 and an upper panel 24 in a battery sub-packing unit. Referring to the drawings, a surrounding cover 22 of a battery sub-packing unit according to an embodiment may include an accommodating can 23 and an upper panel 24. As described above, the surrounding cover 22 including the accommodating can 23 and the upper panel 24 may be a configuration of the first embodiment of the surrounding cover 22.

In this case, the accommodating can 23 may have both end portions to which an end panel 21 is respectively coupled, and may surround a lower surface portion 10*a* and a side surface portion 10*b* of a battery cell 10. The upper panel 24 may be provided to be coupled to an upper end portion of the accommodating can 23, and surround an upper surface portion 10*c* of the battery cell 10.

In this manner, when a battery cell 10 is accommodated, the accommodating can 23 may be provided to have a "C" shape surrounding a lower surface portion 10*a* and both side surface portions 10*b* of one battery cell 10. In addition, when a pair of battery cells 10 are provided, the accommodating can 23 may be provided to have a "C" shape surrounding one side surface portion 10*b* and the other side surface portion 10*b*, opposite thereto, of the pair of battery cells 10 while surrounding lower surface portions 10*a* of the pair of battery cells 10. In addition, when three or more battery cells 10 are provided, the accommodating can 23 may be provided to have a "C" shape surrounding a side surface portion 10*b* of an outermost battery cell 10, among the three or more battery cells 10, and surrounding lower surface portions 10*a* of the three or more battery cells 10.

In addition, the lower surface portion 10*a* of the battery cell 10 may be seated on a lower wall portion 23*c* of the accommodating can 23, a thermally conductive member 23*d* may be provided between the lower wall portion 23*c* of the accommodating can 23 and the lower surface portion 10*a* of the battery cell 10.

As the configuration of the first embodiment of the surrounding cover 22, the upper panel 24 may be coupled to the upper end portion of the accommodating can 23.

The upper panel 24 may be coupled to the upper end portion of the accommodating can 23 to surround the upper surface portion 10*c* of the battery cell 10. For example, the upper panel 24 may be provided to cooperate with the accommodating can 23, to surround the battery cell 10 in a circumferential direction of the end panel 21.

In addition, a coupling groove 24*b* may be formed to couple the upper panel 24 to the upper end portion of the accommodating can 23. A coupling tongue 23*a* that may be fitted into the coupling groove 24*b* may be formed in the accommodating can 23.

For example, an accommodating can 23 of a battery sub-packing unit according to an embodiment may have a coupling tongue 23*a* protruding into an external space may be formed in the upper end portion, and an extended flange portion 24*a* including a coupling groove 24*b* latched by and coupled to the coupling tongue 23*a* may be provided on the both end portion of the upper panel 24.

As an example, an example of a method for an accommodating can 23 and an upper panel 24 to be coupled in a state in which a battery cell 10 is accommodated will be as follows.

In a first operation, at least one battery cell 10 may slide and be inserted into an accommodating can 23. In a second operation, end panels 21 may be disposed on both end portions of the accommodating can 23, and the accommodating can 23 and the end panel 21 may be coupled by welding. In a third operation, an upper panel 24 may be seated on an upper end portion of the accommodating can 23, and a coupling tongue 23a of the accommodating can 23 may be fitted into and fastened to a coupling groove 24b of the upper panel portion 24.

In this case, in the first operation, the battery cell 10 may be seated on a blank material having a plate shape, and both end portions of the blank material may be bent in a direction of a side surface portion 10b of the battery cell 10, to form the accommodating can 23 having a "C" shape.

Figure 4:
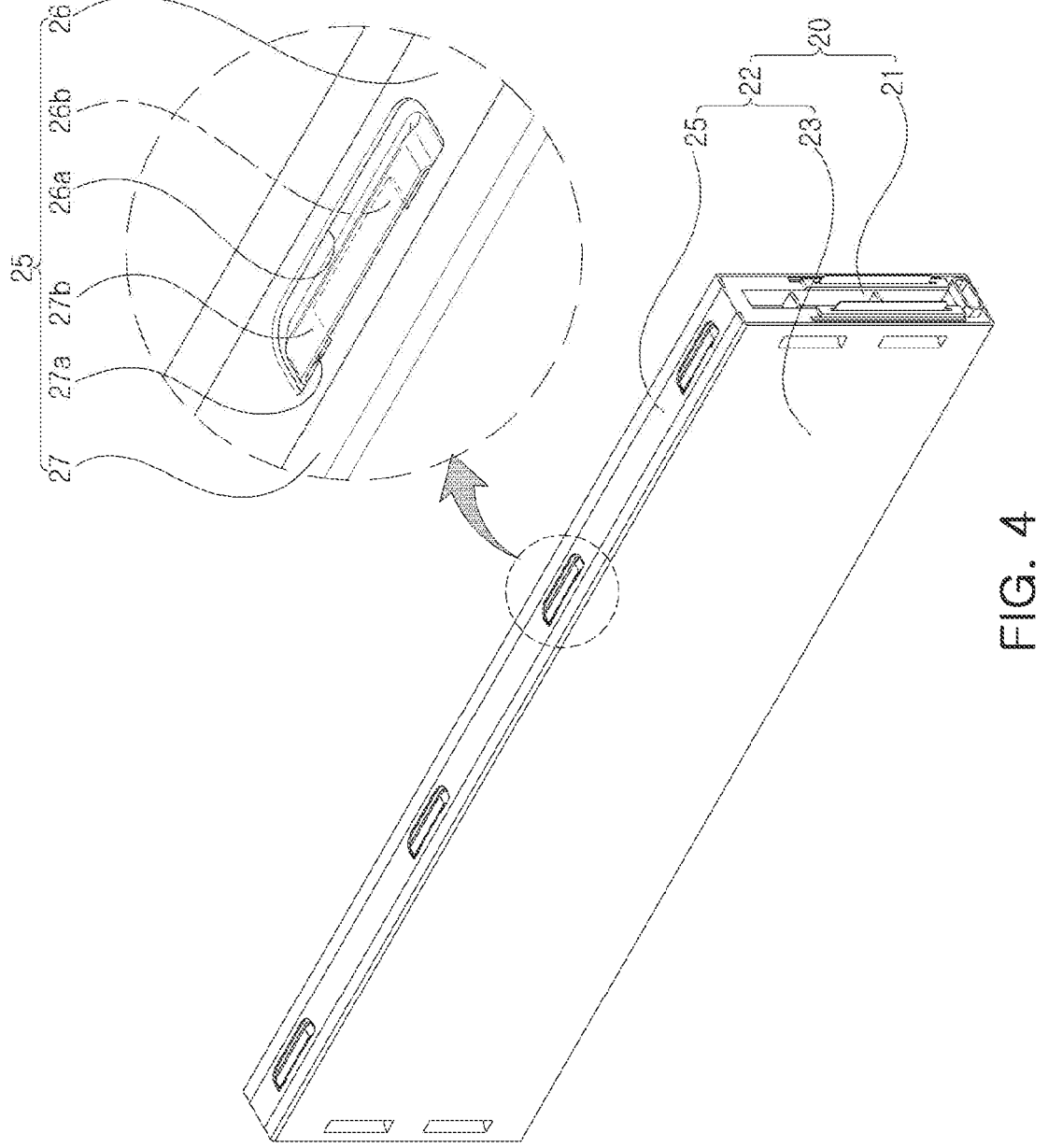
FIG. 4 is a perspective view illustrating an embodiment in which a surrounding cover includes an accommodating can and an upper fastening portion in a battery sub-packing unit.
Figure 5:
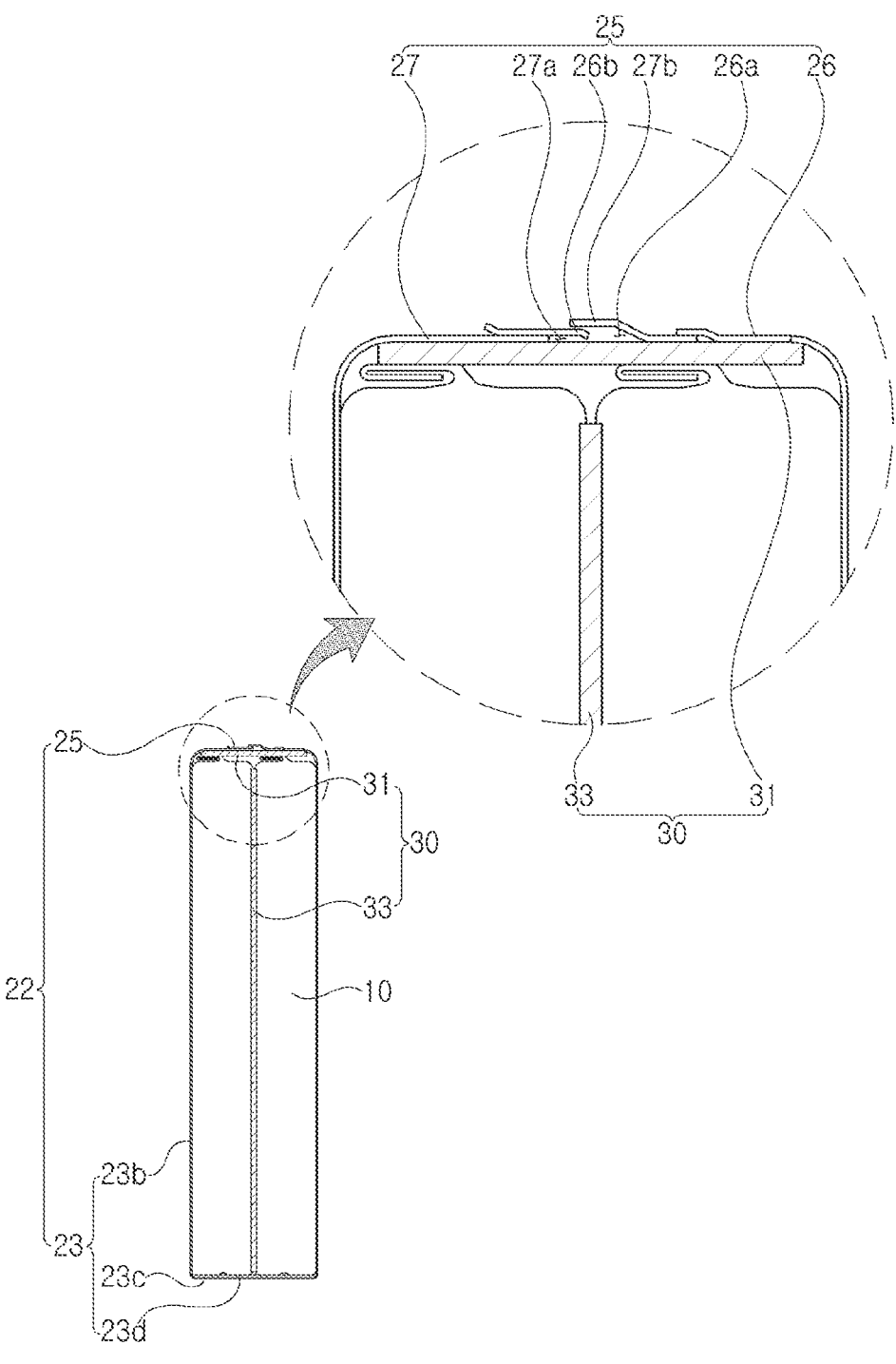
FIG. 5 is a cross-sectional view illustrating an embodiment in which a surrounding cover includes an accommodating can and an upper fastening portion in a battery sub-packing unit.
Figure 6:
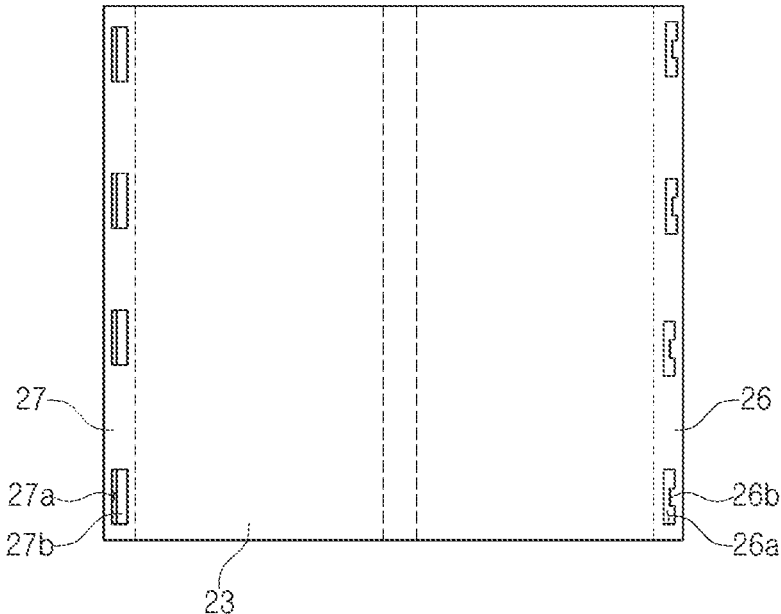
FIG. 6 is a view illustrating a state in which a surrounding cover is unfolded, in an embodiment in which the surrounding cover includes an accommodating can and an upper fastening portion in a battery sub-packing unit.

FIG. 4 is a perspective view illustrating an embodiment in which a surrounding cover 22 includes an accommodating can 23 and an upper fastening portion 25 in a battery sub-packing unit, and FIG. 5 is a cross-sectional view illustrating an embodiment in which a surrounding cover 22 includes an accommodating can 23 and an upper fastening portion 25 in a battery sub-packing unit. FIG. 6 is a view illustrating a state in which a surrounding cover 22 is unfolded, in an embodiment in which the surrounding cover 22 includes an accommodating can 23 and an upper fastening portion 25 in a battery sub-packing unit.

Referring to the drawings, a surrounding cover 22 of a battery sub-packing unit according to an embodiment may include an accommodating can 23 and an upper fastening portion 25. As described above, the surrounding cover 22 including the accommodating can 23 and the upper fastening portion 25 may be a configuration of the second embodiment of the surrounding cover 22.

In this case, the accommodating can 23 may have both end portions to which an end panel 21 is respectively coupled, and may surround a lower surface portion 10a and a side surface portion 10b of a battery cell 10. The upper fastening portion 25 may extend from side wall portions 23b of the accommodating can 23 opposing each other, may be arranged to have a shape bent in a direction of an upper surface portion 10c of the battery cell 10, and may be fastened to each other as a pair of upper fastening portions to surround the upper surface portion 10c of the battery cell 10.

As such, at least one battery cell 10 may be accommodated in the accommodating can 23, and may be provided to have a "C" shape surrounding the side surface portion 10b and the lower surface portion 10a of the battery cell 10.

In addition, the lower wall portion 10a of the battery cell 10 may be seated on a lower wall portion 23c of the accommodating can 23, a thermally conductive member 23d may be provided between the lower wall portion 23c of the accommodating can 23 and the lower surface portion 10a of the battery cell 10.

As the configuration of the second embodiment of the surrounding cover 22, the upper fastening portion 25 may be integrally formed on the both end portions of the accommodating can 23.

The upper fastening portion 25 may extend from a pair of side wall portions 23b of the accommodating can 23, and may be configured to surround the upper surface portion 10c of the battery cell 10.

Specifically, an upper fastening portion 25 of a battery sub-packing unit according to an embodiment may include a first fastening portion 26 and a second fastening portion 27.

In this case, the first fastening portion 26 may extend from one side wall portion 23b of the accommodating can 23, may have a latching groove 26a formed therein, and having a hook 26b protruding onto an internal side of the latching groove 26a. The second fastening portion 27 may extend from the other side wall portion 23b of the accommodating can 23, and may have an accommodation groove 27a into which the hook 26b is fitted.

For example, the first fastening portion 26 and the second fastening portion 27 may be respectively bent in the direction of the upper surface portion 10c of the battery cell 10, and the hook 26b may be fastened to be latched by the accommodating groove 27a, to fasten the first fastening portion 26 and the second fastening portion 27 to each other.

In this case, a direction in which the hook 26b protrudes may be a direction of one end portion of the first fastening portion 26, a boundary portion in which the first fastening portion 26 is integrally connected to the accommodating can 23. Therefore, although a force widening in an outward direction is applied to the accommodating can 23 by spring back, coupling between the first fastening portion 26 and the second fastening portion 27 becomes more robust.

In addition, when the hook 26b is fitted into and assembled with the accommodating groove 27a, the second fastening portion 27 may form a stepped portion 27b, not to have a height difference between the first fastening portion 26 and the second fastening portion 27. For example, the stepped portion 27b may be a portion capable of shifting a space in which the hook 26b is inserted into and disposed in the accommodating groove 27a in an upward direction by a thickness of the hook 26b.

As an example, an example of a method for an accommodating can 23 and an upper fastening portion 25 to be coupled in a state in which a battery cell 10 is accommodated will be as follows.

In a first operation, an battery cell 10 may be seated on a blank material having a plate shape, and both end portions of the blank material may be bent in a direction of a side surface portion 10b of a battery cell 10, to form the accommodating can 23 having a "C" shape, to surround the battery cell 10. In a second operation, end panels 21 may be disposed on both end portions of the accommodating can 23, and the accommodating can 23 and the end panel 21 may be coupled by welding. In a third operation, a first fastening portion 26 and a second fastening portion 27, extending upwardly from both side wall portions 23b of the accommodating can 23, may be bent in a direction of an upper surface portion 10c of the battery cell 10, and at this time, a hook 26b may be fitted into and fastened to an accommodating groove 27a.

In this case, the first operation may be performed in such a manner that the battery cell 10 is slidably inserted into both end portions of the accommodating can 23 after forming the accommodating can 23 having a "C" shape in advance.

Figures 7A, 7B, 7C:
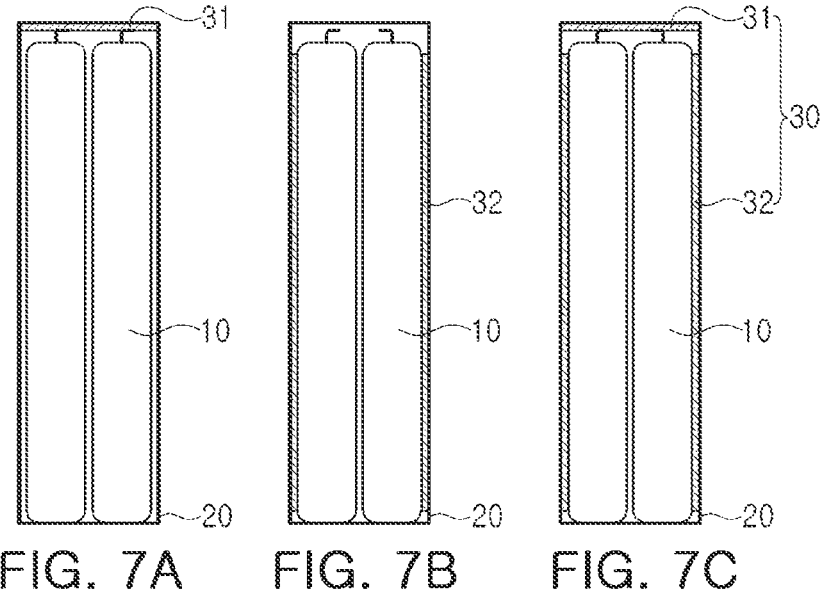
FIG. 7A, FIG. 7B, FIG. 7C, FIG. 7D, FIG. 7E, FIG. 7F and FIG. 7G are a cross-sectional view illustrating an embodiment in which a battery sub-packing unit includes an inner pad.
Figures 7D, 7E, 7F, 7G:
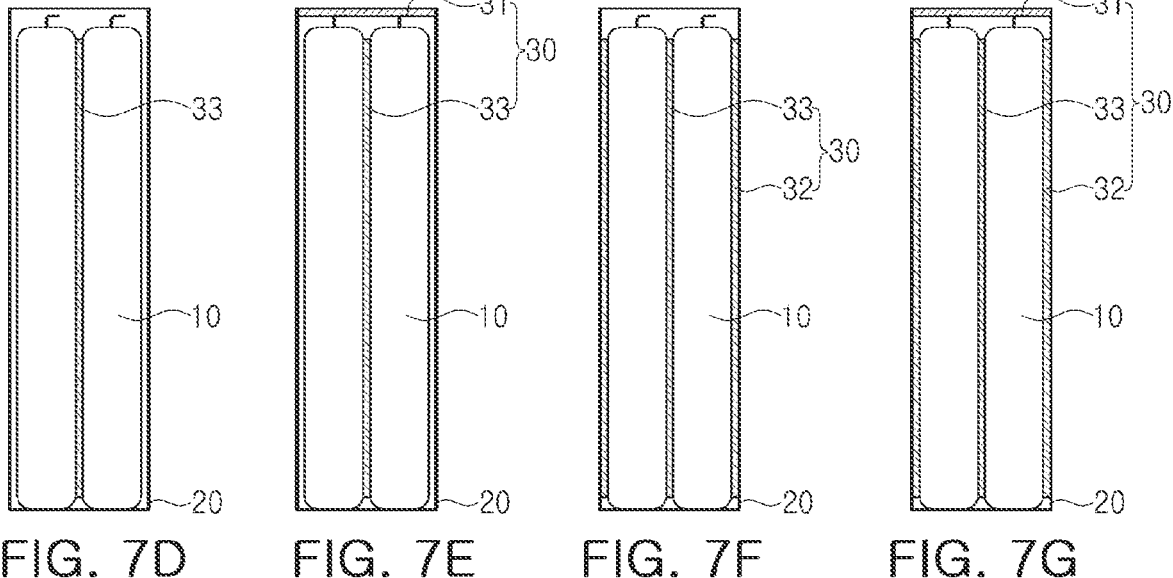
Figure 8:
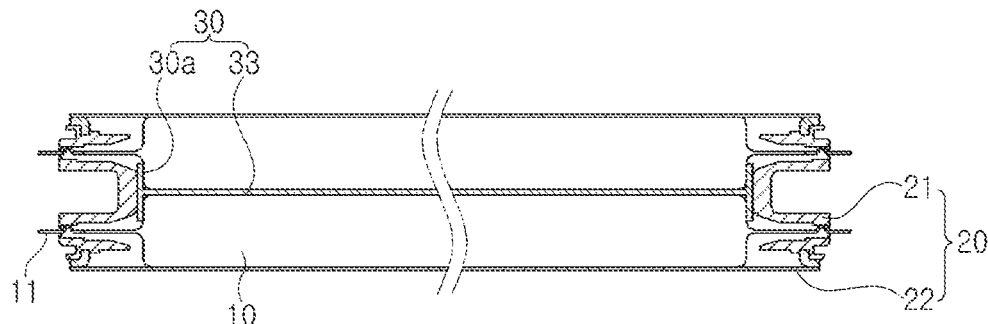
FIG. 8 is a plan view illustrating an embodiment in which an inner pad further includes a pad flange portion in a battery sub-packing unit.

FIG. 7 is a cross-sectional view illustrating an embodiment in which a battery sub-packing unit includes an inner pad 30, and FIG. 8 is a plan view illustrating an embodiment in which an inner pad 30 further includes a pad flange portion 30a in a battery sub-packing unit.

Referring to the drawings, a battery sub-packing unit according to an embodiment may further include an inner pad 30.

In this case, the inner pad 30 may be disposed in an internal space of a case 20, may be in contact with a battery cell 10 accommodated in the case 20, and may generate at least one of carbon dioxide or nitrogen during oxidation to block inflow of external oxygen.

For example, as the inner pad 30 is oxidized by flames generated in the battery cell 10 in the case 20, at least one of carbon dioxide or nitrogen may be generated, and the carbon dioxide and the nitrogen may fill the internal space of the case 20. Therefore, a problem of flowing the external oxygen into the internal space of the case 20 may be blocked. Therefore, in the internal space of the case 20, oxidation may not proceed further and extinguishing may be executed.

Moreover, since the inner pad 30 is in contact with all the battery cells 10, even though flames occurs in any one of the plurality of battery cells 10, the inner pad 30 may be immediately oxidized to generate at least one of carbon dioxide or nitrogen. As a result, extinguishing may be executed quickly.

In this case, an inner pad 30 of a battery sub-packing unit according to an embodiment may be formed of a melamine material.

The melamine material may have a relatively large rate of nitrogen generation during oxidation, as compared to other materials, and may be thus more effective for extinguishing.

In addition, an inner pad 30 of a battery sub-packing unit according to an embodiment may be disposed in at least one of a space between a side surface of the battery cell 10 and an inner surface of the case 20, or a space between an upper surface of the battery cell 10 and the inner surface of the case 20. For example, in order for the inner pad 30 to contact all the battery cells 10, the inner pad 30 may include a side pad 32 disposed between the side surface of the battery cell 10 and the inner surface of the case 20, and an upper pad 31 disposed between the upper surface of the battery cell 10 and the inner surface of the case 20. In this case, the inner pad 30 may also serve to protect the battery cell 10 from external impact, or to buffer swelling of the battery cell 10.

In addition, when a plurality of battery cells 10 are provided, an inner pad 30 of a battery sub-packing unit according to an embodiment may be disposed between battery cells 10 adjacent to each other. For example, the inner pad 30 may include a center pad 33 disposed between the battery cells 10 adjacent to each other. In this case, the inner pad 30 may play a role of blocking heat transfer between the battery cells 10 adjacent to each other.

In addition, an inner pad 30 of a battery sub-packing unit according to an embodiment may have both end portions in which a pad flange portion 30a extending in an electrode tab 11 direction of the battery cell 10. For example, since the pad flange portion 30a is disposed around the electrode tab 11 in which flames of the battery cell 10 is frequently emitted, extinguishing may be executed more rapidly.

A battery sub-packing unit according to embodiments may have an advantage of preventing propagation of ignition of battery cells.

In another aspect, a battery sub-packing unit according to embodiments may have an advantage of inducing flames to an external space or extinguishing the flames, when a battery cell is ignited.

In another aspect, when a battery sub-packing unit according to embodiments is mounted on an electric vehicle, a problem that an occupant of the electric vehicle is affected by flames when a battery cell is ignited may be minimized.

However, various advantages and effects according to embodiments are not limited to the above-described contents, and may be more easily understood in the process of describing specific embodiments.

While example embodiments have been shown and described above, it will be apparent to those skilled in the art that modifications and variations could be made without departing from the scope of the present disclosure as defined by the appended claims.

What is claimed is:

1. A battery sub-packing unit comprising:
at least one battery cell comprising an electrode tab; and
a case accommodating the at least one battery cell,
wherein the case comprises an end panel on which the electrode tab of the at least one battery cell is fastened to extend into an external space, and having a lower end portion in which a sub-vent hole is formed for communication between the external space and an internal space in which the at least one battery cell is disposed,
wherein the battery sub-packing unit further comprises:
an inner pad disposed in the internal space of the case, contacting the at least one battery cell accommodated in the case, and
wherein the inner pad is configured to generate at least one of carbon dioxide or nitrogen during oxidation for filling the internal space of the case to block inflow of external oxygen,
wherein the at least one battery cell is provided as a plurality of battery cells, and the inner pad is disposed between battery cells adjacent to each other among the plurality of battery cells, and
wherein the inner pad comprises a pad flange portion located between electrode tabs of the plurality of battery cells adjacent to each other.

2. The battery sub-packing unit of claim 1,
wherein the end panel includes a front end panel and a rear end panel,
wherein the case comprises a surrounding cover having front and rear end portions,
wherein the front and rear end panels are respectively coupled to the front and rear end portions of the surrounding cover of the case, and
wherein the surrounding cover surrounds the at least one battery cell in a circumferential direction of the end panel.

3. The battery sub-packing unit of claim 2, wherein the end panel comprises a sub-guide tube disposed around the sub-vent hole, communicating with the sub-vent hole, and extending in an outward direction.

4. The battery sub-packing unit of claim 2, wherein an edge portion of the front and rear end panels is formed of a metal material identical to a metal material of the surrounding cover, and is coupled by welding to the front end portion and the rear end portion of the surrounding cover, respectively, and
wherein each of the front and rear end panels include a slit opening through which the electrode tab of the at least one battery cell passes, and
wherein a portion of each of the front and rear end panels which includes the slit opening is formed of an insulating material.

5. The battery sub-packing unit of claim 2, wherein the surrounding cover comprises at least one of aluminum, stainless steel, or a metal having a melting point of 1000° C. or higher.

6. The battery sub-packing unit of claim 2, wherein the surrounding cover comprises:
an accommodating can having the front and rear end portions to which the front and rear end panels are respectively coupled, the accommodating can surrounding a lower surface portion and a side surface portion of the at least one battery cell; and an upper panel coupled to an upper end portion of the accommodating can and surrounding an upper surface portion of the at least one battery cell.

7. The battery sub-packing unit of claim 6, wherein the accommodating can comprises a coupling tongue protruding into the external space at the upper end portion of the accommodating can, and wherein the upper panel comprises an extended flange portion including a coupling groove coupled to the coupling tongue.

8. The battery sub-packing unit of claim 2, wherein the surrounding cover comprises:

an accommodating can having the front and rear end portions to which the front and rear end panels are respectively coupled, and surrounding a lower surface portion and a side surface portion of the at least one battery cell; and a pair of upper fastening portions extending in opposite directions from both side walls of the accommodating can, and fastened to each other to surround the upper surface portion of the at least one battery cell.

9. The battery sub-packing unit of claim 8, wherein each of the pair of upper fastening portions comprises:

a first fastening portion extending from one side wall of the accommodating can, having a hook protruding toward the one side wall of the accommodating can; and a second fastening portion extending from another side wall of the accommodating can and having an accommodation groove into which the hook is accommodated.

10. The battery sub-packing unit of claim 1, wherein the inner pad is formed of a melamine material.

11. The battery sub-packing unit of claim 1, wherein the inner pad is disposed in at least one of between a side surface of the at least one battery cell and an inner surface of the case and between an upper surface of the at least one battery cell and the inner surface of the case.

12. The battery sub-packing unit of claim 1, wherein the pad flange portion extends from both ends of the inner pad toward the electrode tab of the at least one battery cell adjacent to the inner pad.

13. A battery sub-packing unit comprising:

at least two battery cells each comprising an electrode tab;

an inner pad separating the at least two battery cells; and a case enclosing the at least two battery cells and the inner pad;

wherein the case comprises an accommodating can, front and rear end panels coupled to front and rear end portions of the accommodating can, and a pair of upper fastening portions extending in opposite directions from opposite side walls of the accommodating can, and wherein the pair of upper fastening portions are coupled to each other to secure the case around the at least two battery cells, and wherein the inner pad is in direct contact with the at least two battery cells and is configured to generate at least one of carbon dioxide or nitrogen during oxidation to block inflow of external oxygen inside the case, and wherein the inner pad comprises a pad flange portion located between electrode tabs of the at least two battery cells adjacent to each other.

14. The battery sub-packing of claim 13, wherein each of the front and rear end panels includes:

at least two slit openings through which electrode tabs from the at least two battery cells are passing to extend out of the case, and at least one sub-vent for allowing fluid communication between an interior of the case and an outside of the case.

15. The battery sub-packing unit of claim 13, wherein the coupling of the first and second fastening portions includes latching a plurality of hooks of the first fastening portion with a corresponding plurality of accommodation grooves of the second fastening portion.

16. The battery sub-packing unit of claim 13, wherein the inner pad is formed of a melamine material.

\* \* \* \* \*